O. TUFTS.
MEANS FOR OILING BODIES ROTATING AROUND SHAFTS.
No. 60,444. Patented Dec. 11, 1866.
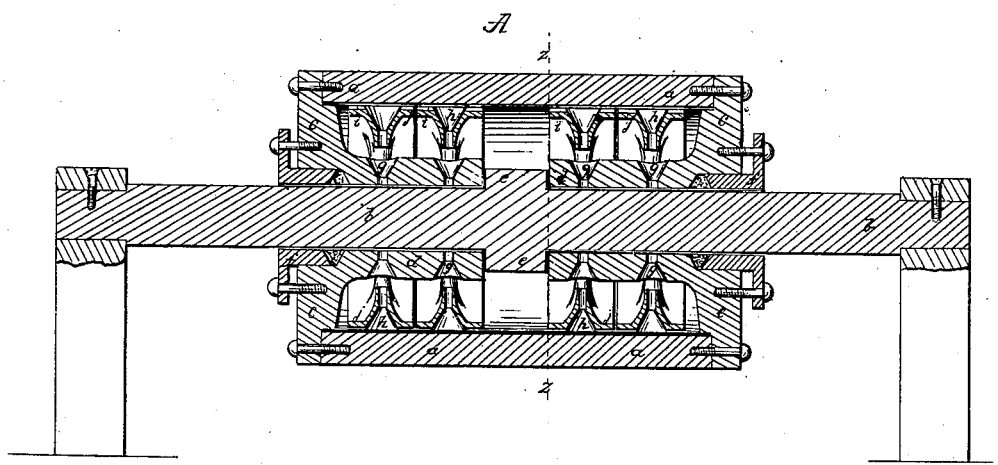
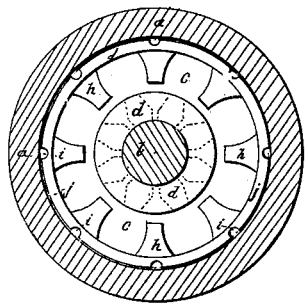

United States Patent Office.

IMPROVEMENT IN MEANS FOR OILING BODIES ROTATING AROUND SHAFTS.

OTIS TUFTS, OF BOSTON, MASSACHUSETTS.

*Letters Patent No. 60,444, dated December 11, 1866.*

---

The Schedule referred to in these Letters Patent and making part of the same.

---

TO ALL WHOM IT MAY CONCERN:

Be it known that I, OTIS TUFTS, of Boston, in the county of Suffolk, and State of Massachusetts, have invented an improved Means for Oiling Bodies Rotating around Shafts; and I do hereby declare that the following, taken in connection with the drawings which accompany and form part of this specification, is a description of my invention sufficient to enable those skilled in the art to practise it.

In those cases where pulleys, rollers, clutches, &c., are made to rotate around shafts or axes, instead of with them, it is a troublesome matter to keep the wearing friction surfaces thereof well oiled, the means for such oiling having consisted only of open oil holes leading to said surfaces, so that much of the oil applied is lost by gravity and centrifugal action, while to the loss of the lubricant so applied is added the annoyance and damage resulting from the discolored fatty drippings of the lubricant.

The object of my invention is to supply an improved means for oiling bodies revolving on their supports, instead of with them, said means operating to afford sufficient lubricity to the wearing surfaces for a long time, and preventing waste by dripping, by centrifugal action, by evaporation, and avoiding the several troubles caused by the addition of dust and dirt to the lubricant.

Of the drawings, A represents in vertical longitudinal section a pulley, or the hub of a pulley, arranged to revolve freely on the shaft supporting the same.

B represents a cross section of the same taken in the line $z\ z$.

Suppose $a$ to be a pulley, or clutch, or other rotating body, or the hub of one, intended to rotate freely around shaft $b$. $a$ is made as a hollow cylinder supplied with closely fitting heads, $c$, having long hubs, $d$, projecting into the space enclosed by $a$ and $c\ c$, said hubs being bored to fit upon the shaft $b$, with their ends abutting against a collar, $e$, made with or fixed on shaft $b$. The heads $c$, where the shaft $b$ emerges therefrom, are provided with suitable stuffing-boxes having the requisite packings and followers, $f\ f$, so that the interior of $a$ can be made to hold without leakage, oil or other fluid lubricants. The closed cavity thus made within $a$ is wholly or partially filled with a fluid lubricant through any suitable opening provided with a screw or other removable plug, for tightly closing the same. The abuttal of the ends of hubs $d\ d$ against the collar $e$, prevents endwise movement of $a$, and the hubs are pierced with oil holes, as at $g\ g$, through which the lubricant finds its way to the shaft. When the space in $a$ is not filled with the lubricant up to the lower surface of the shaft, when $a$ is at rest, then when $a$ is set in rapid rotation, centrifugal force will throw the lubricant away from the shaft and hubs, so that it becomes necessary to provide a means for securing a flow of the lubricant upon the wearing surfaces of the shaft and hubs, which shall operate at each stoppage of the rotation of $a$, or at a considerable slackening thereof.

The means which I employ for this purpose consist of cups or cavities secured at or to the inner periphery of $a$, these cups being marked $h$, each having a directing tube leading therefrom, directed inward and toward an oil hole in one of the hubs. Close to the said periphery channels marked $i$ are made, which open into the cups $h$. The operation of this device is as follows: The lubricant, even when there is but a small quantity thereof in $a$, is thrown outward by rotation and fills the cups $h$, so that when the rotation of $a$ stops or is slackened so that the oil can gravitate, the oil in the cups which happen to be highest, will fall into the corresponding oil holes $g$, immediately beneath, and will thus lubricate the hub and shaft. For convenience in securing the oil cups $h$ in proper position, I make them as parts of or attached to the ring $j$.

I claim the construction substantially as shown, of a loose pulley, clutch, or other similar device or the hub thereof, with a removable head or heads, when the removable head or heads are provided with suitable packing, so as to form a closed cavity for containing lubricant directly around the parts to be lubricated.

Also the oil cups $h$, when arranged within the cavity aforesaid, so as to operate as described.

OTIS TUFTS.

Witnesses:
   J. B. CROSBY,
   W. B. GLEASON.